United States Patent [19]
Brandi, deceased et al.

[11] 3,985,995

[45] Oct. 12, 1976

[54] METHOD OF MAKING LARGE STRUCTURAL ONE-PIECE PARTS OF METAL, PARTICULARLY ONE-PIECE SHAFTS

[75] Inventors: Hermann Th. Brandi, deceased, late of Mulheim-Ruhr-Speldorf, Germany, by Marianne Brandi, sole heiress; Herbert Luckow, Dusseldorf, Germany

[73] Assignee: August Thyssen-Hutte Aktienges., Duisburg-Hamborn, Germany

[22] Filed: Apr. 16, 1974

[21] Appl. No.: 461,343

[30] Foreign Application Priority Data
Apr. 19, 1973 Germany............................ 2320186
Dec. 24, 1973 Germany............................ 2364495

[52] U.S. Cl. ................................................. 219/76
[51] Int. Cl.² ........................................... B23K 9/04
[58] Field of Search ................ 219/76, 77; 29/187.5

[56] References Cited
UNITED STATES PATENTS

| | | | |
|---|---|---|---|
| 3,071,490 | 1/1963 | Pevar | 219/76 X |
| 3,139,505 | 6/1964 | Kirschning | 219/76 X |
| 3,549,410 | 12/1970 | Farmer | 219/76 X |
| 3,579,800 | 5/1971 | Packard | 29/187.5 X |
| 3,624,345 | 11/1971 | Armstrong | 219/76 X |
| 3,665,143 | 5/1972 | Ujiie | 219/76 |

*Primary Examiner*—J. V. Truhe
*Assistant Examiner*—N. D. Herkamp
*Attorney, Agent, or Firm*—Toren, McGeady and Stanger

[57] ABSTRACT

Very large diameter metal shafts for turbines and electric generators, and other large structural metal parts, can be made in one piece to a high quality without occlusions, cavities, segregations, and cracks by building the part up layer by layer, each layer being formed by deposition of molten metal by welding along neighbouring tracks which together cover the area over which the layer is to be deposited. The weld deposition of the metal may be effected by a welding head which is moved longitudinally along the part, and if the part is simultaneously rotated the metal is deposited along a helical path in forming a layer. A plurality of welding heads may be used so that metal is deposited simultaneously at different positions during the construction of each layer.

11 Claims; 3 Drawing Figures

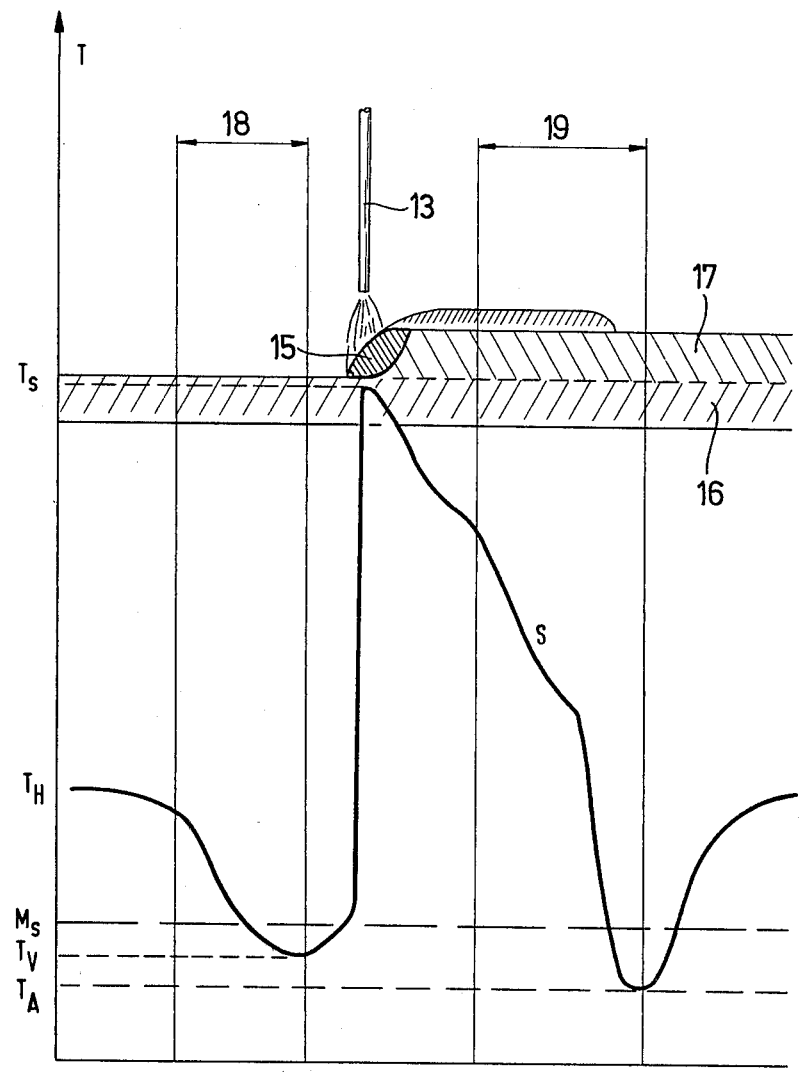

METHOD OF MAKING LARGE STRUCTURAL ONE-PIECE PARTS OF METAL, PARTICULARLY ONE-PIECE SHAFTS

The invention relates to a process for making large structural parts, particularly one-piece shafts for example for turbines and electric generators, the parts being free from occluded cavities, segregations and cracks.

Large structural parts of this kind, for example turbine rotors and electric generator shafts are subjected to very high stresses in operation. Turbine rotors are usually operated at temperatures up to 600° C and pressures up to 250 cb. The materials of construction must therefore satisfy very high specifications. On top of this there is a constant evolution towards generator units of increasing size, involving larger shafts and rotors.

Highly stressed rotating parts such as turbine rotors and generator shafts are stressed in several directions. They are conventionally made from steel castings or forged blanks. The part usually rotates at high speed in operation and is therefore subjected to high centrifugal forces. It must have sufficient toughness and a high yield strength. A rotor, particularly in the high-pressure part of the turbine, must have a high fatigue strength, low fatigue embrittlement at temperatures up to 600° C and the notch impact strength transition temperature must be low. The part must be safe against brittle-fracture and must show a high retention of hardness. Finally, in the case of electric generator shafts, the part must show the highest possible magnetic induction.

If the part is manufactured by conventional methods, using the known alloys, the required properties can be obtained only by tempering the part. The tempering process usually involves annealing to give the material an austenite structure. This is followed by oil or water quenching down to temperatures below 600° C, or even below 300° C. The part is then held for a long period at these temperatures. It is cooled at a controlled rate and finally annealed. But the success of a tempering process of this sort depends on the diameter of the part, which influences the differences between the cooling rates in different regions during quenching, and also of course depends on the composition of the alloy.

The known materials of construction all have the disadvantage that they cannot be satisfactorily tempered all the way through if the part has a large diameter, for example greater than 1200 mm. Consequently the completed part has mechanical properties which vary between the outer layers and the core. This difference is particularly critical in regard to the notch-impact strength transition temperature, which should be as low as possible. In practice, depending on the composition of the alloy and on the shaft diameter, this can vary even in the most favourable cases by 100° C between the outer layers of the part and the core.

Apart from the alloy composition the properties of a large structural part of this kind depend greatly on the initial ingot structure. What is most important is that chemical composition and crystalline structure should be as homogeneous as possible both longitudinally and over the cross section of the shaft. The crystalline structure can be improved by tempering and a more homogeneous structure can be obtained in this way. Nevertheless there still remain inhomogeneities such as ingot faults and occlusions which it is impossible to remedy.

The ingot faults involved are mainly segregations, cavities and cracks. Harmful occlusions consist mainly of oxides and gases evolved during the cooling of the ingot. The most important of these faults are the segregations and the oxide occlusions. Segregation in the cooling ingot results in different chemical compositions in the ingot foot and head and between the outer layers and the core. These differences cannot be removed by annealing, as can the intra-crystalline segregations. Moreover the possibilities of a subsequent annealing, with a view to removing concentration differences, are limited in the case of very large workpieces, due to the great size of the furnace required and due to the crystalline changes which inevitably occur during annealing.

The differences in the concentrations of the alloy components resulting from segregation in the cooling ingot result, in a completed forge shaft, in corresponding differences in the properties of the material between the outer layers and the core and/or over the length of the shaft. For example different magnetic properties can be attributed to segregation of carbon away from the ingot foot, increasing magnetic induction in the foot and reducing it near the ingot head. The segregation of the carbon also changes the transition temperatures.

A further cause of differences in the properties of the material in different regions of the completed shaft is the presence of occluded oxides deriving from the process of oxygen removal and also coming from the vessel linings with which the melt has come into contact. The oxide occlusions act as notches in the material of the shaft, impairing its mechanical properties, in particular lowering its brittlefracture strength. In attempting to reduce the quantities of harmful occlusions of this kind, in addition to the usual impurities, it has recently become the practice to melt shaft steels in electric furnaces and subject the melt to a vacuum treatment before casting. This involves increased capital and manufacturing costs and sets a practical limit to the desired increase in shaft diameter and length, simply because the sizes of the available furnaces, vacuum systems, ingot moulds and forging presses are limited. Very large workpieces also involve increasing difficulties in quenching with oil or water.

A further serious disadvantage involved in manufacturing large rotors and shafts as single forged pieces is the great loss of material due to the fact that both the ingot foot and the ingot head have to be removed. Considerable material is also lost during the cutting operations which follow the forging. The material lost can be of the order of 30% to 60%, seriously increasing manufacturing costs.

As a result of the difficulties mentioned above the situation at the present time is that it is unpracticable to attempt, by the conventional methods, to make parts with diameters greater than approximately 1900 mm. The mass of the ingot is limited in the same way to about 300 t.

The aim in the present invention is to remove these difficulties and, in particular, to propose a process for making large structural parts which allows workpieces of any size to be made in which the material is either entirely homogeneous throughout or can, if desired vary in an intended way, from region to region, in regard to its technological properties, without it being necessary to apply hot deformation or annealing to the product.

The solution proposed according to the invention is based on the idea of building the part up continuously, using an alloy of suitable composition. The workpiece is built up by continuous deposition, layer over layer, of molten metal along neighbouring and overlapping tracks.

The continuous deposition of molten metal, either along a single track or simultaneously along several tracks, is effected by arc welding or by plasma welding. An advantage obtained is that only a very small quantity of metal is in the molten state at each instant. The molten metal is cooled to the solid state without any risk of non-metal occlusions, cavities or segregations occurring. No special moulds are required. The chemical composition of the melt can if desired remain constant all through the operation, giving a chemically homogeneous structure. If the cooling conditions are also held constant the crystalline structure of the part is also homogeneous. A perlite crystalline structure is preferred. The completed part therefore has isotropic propeties. This cannot be obtained using conventional methods.

The process according to the invention can be performed as follows. Onto a temporary support, which can be of steel or of copper, there is deposited metal along longitudinal tracks, so as to form a core. After several layers have been deposited in this way the temporary support can be removed. The core is then driven in rotation and further metal is deposited on it along tracks, layer by layer, until the part has been built up to the desired dimensions. Depending on the particular application for which the part is intended, a solid or a hollow core can be formed in other ways.

In the manufacture of large structural parts by the method according to the invention the operating conditions, that is to say the rate of melting, the input of electric energy, the pre-heating of the workpiece and if desired also its cooling are all chosen to suit the special nature of the process, the nature of the metal used and the changing dimensions of the workpiece, so as to give the workpiece the desired mechanical properties in all regions. It should be observed that the individual layers of metal deposited are very thin compared to the diameter of the workpiece.

An important advantage of the process according to the invention is that the workpiece can be given the desired properties simply by suitably choosing the composition of the alloy, without difficulties arising due to the necessity of applying a subsequent annealing. The composition of the alloy can if desired be changed during the course of the operation so as to produce different alloy compositions in different regions of the product. For example different alloy compositions can be used in the core and near the outer surface and the alloy composition can be different near the ends of the shaft compared to its middle part, to suit the different mechanical properties required. Thus the alloy composition can be adapted in some regions in a generator shaft to the mechanical stresses to which the shaft will be subjected in these regions, and in other regions to give a good pattern of lines of force. The different alloy compositions can be made to merge into each other gradually so that the alloy composition changes continuously from one region to another.

The process according to the invention also makes it possible to vary the heat treatment applied to the deposited metal, for example the rapidity of cooling, continuously from region to region, so as to influence the crystalline structure in a desired manner.

In the operation of the process according to the invention internal tensions develop in the deposited metal, which can under certain circumstances, depending on the strength and toughness of the metal, result in the appearance of cracks. The internal tensions are due to the temperature gradients between the welding point and the remainder of the workpiece, and are influenced by changes in crystalline structure. In order to keep the workpiece as a whole free from stresses, and so as to produce the desired crystalline structure, the body of the workpiece is kept at a definite temperature, whereas the deposited metal is quenched at a rate of cooling suitable for forming the desired crystalline structure. According to the invention the workpiece itself is held at a temperature between 200° and 600° C, whereas the deposited metal is quenched locally down to a temperature below the martensite point Ms. Furthermore, according to the invention, the welding region can if desired be locally pre-cooled, by applying a cooling medium, upstream of the welding point, to increase the rapidity of quenching of the deposited metal. In further development of the invention the deposited metal can if desired also be cooled, by means of a cooling medium, after it has been deposited.

In this way the rate of cooling of the deposited metal can be adjusted as desired. The crystalline structure of the material of the workpiece depends on the degree of pre-cooling, the degree of post-cooling, the holding temperature of the workpiece body and the rate at which heat is applied during the welding. The holding temperature of the workpiece, in conjunction with the controlled cooling of the deposited metal, allows the metal to be deposited more rapidly, because the heat does not all have to be conducted away through the body of the workpiece.

The workpiece is preferably held, during the welding, at at least 500° C, the deposited metal being quenched down to 300° C or even lower, in all cases to below the martensite point Ms. Special advantages are obtained by producing a predominantly bainite or bainite-like crystalline structure. This gives an excellent combination of high tensile strength, with good toughness, without involving any special heat treatment. There is no risk of cracks forming, because the welding stresses are removed by the holding temperature of the workpiece. This does not introduce any undesired change in the rate of quenching.

The process according to the invention can be performed using a steel alloy containing 0.01 – 1.0%, preferably 0.10% carbon; 0.05 – 1.0% silicon and 0.20 – 2.50% manganese; and also if necessary up to 5.0% chromium; up to 5.0% nickel; up to 2.0% molybdenum; up to 1.0% vanadium; up to 0.2% tantalum and/or niobium; up to 0.50% titanium; up to 1.5% copper; up to 0.5% aluminium; up to 0.5% selenium and up to 0.5% zirconium, individually or together, the remainder, including impurities introduced during the melting, iron.

The body of the workpiece is pre-cooled locally, in the welding zone, and the deposited metal can be cooled after deposition, by a fluid medium, for example by sprays of water or jets of air. The workpiece is held at the holding temperature by means of an extra source of heat, for example by radiant or convective heating. The heating of the workpiece as a whole, to keep it at the holding temperature, is effected independently of the quenching of the deposited metal and consequently the deposited metal is quenched at exactly the rate of cooling required to produce the desired crystalline structure. The process according to the invention makes it possible to apply automatic control to the electric power applied in welding, the pre-cooling temperature, the quenching rate and the holding temperature of the workpiece, ensuring the best possible operating conditions.

The pre-cooling temperature and the quenching rate can be controlled not only by controlling the rate of flow of cooling medium but also by adjusting the distance between the two cooling points and the welding point and by adjusting the area of workpiece surface cooled.

It is possible, using the process according to the invention, to produce in the deposited metal internal tensile stresses which act centripetally against the centrifugal forces acting on the workpiece when it is rotating rapidly in operation. That is to say the workpiece can be pre-stressed in an advantageous manner.

It is also possible to apply a continuous heat treatment to the deposited metal by varying the welding power applied. The sensible heat in the molten metal is transferred to a considerable extent to the deposited metal behind the weld, which has already solidified. Finally the invention provides the advantage that faults in the deposited metal can be detected immediately and if necessary eliminated. For this purpose a test apparatus can be installed near the welding zone.

Due to the high purity of the deposited metal, the welding is preferably conducted under a layer of powder. This allows the alloy components to be introduced partly from the electrode, which can for example be a wire electrode, and partly from the powder and/or from other additives.

The invention will now be described in greater detail on the basis of several examples, together with the drawing, in which:

FIG. 3 shows a cylindrical part made of metal deposited by welding.

Figure 1:
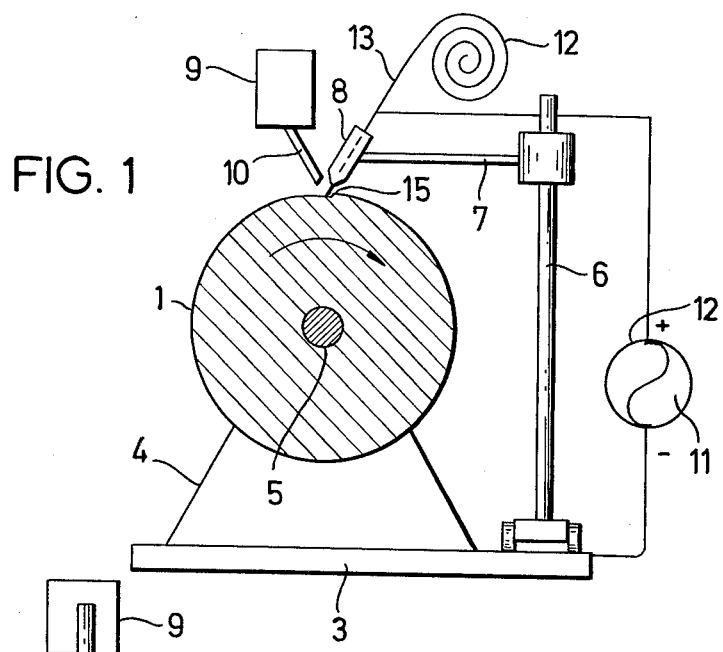
FIG. 1 is a diagrammatic cross section through a shaft mounted in a device suitable for performing the process according to the invention.

The device for performing the process according to the invention consists of a base plate 3 supporting two end-supports 4, which themselves support the two ends of a core 5. A mobile support 6, which travels under automatic control, has a horizontal boom 7 supporting a welding head 8 and a powder container 9 capable of discharging powder through a dispenser tube 10. Electric power is supplied to the device from a power source 11.

A storage reel 12 feeds wire electrode 13 to the welding head 8, molten metal being deposited continuously onto the surface of a core 5 which is driven in rotation by a drive 14. Starting from the core 5 a workpiece shaft is built up continuously by depositing molten metal along a spiral track 15, the welding head 8 travelling axially relative to the rotating workpiece. The welding head 8 operates by arc welding, depositing molten metal from the electrode wire 13 in the form of the spiral weld-bead 15. The weld-bead forms layers of metal 16, 17, the deposited metal being built up in thickness, layer over layer, to form the main body of the shaft.

Upstream of the welding head 8, that is to say before the welding head in the direction of rotation of the workpiece, there is a pre-cooling zone 18. Downstream of the welding head 8 there is a post-cooling zone 19. Cooling medium is applied to the surface of the workpiece in these two cooling zones, which are limited in area, that is to say the cooling medium is applied only locally. The main body of the workpiece is held at a holding temperature $T_H$, quite independently of the temperatures of the two cooling zones 18, 19. In the pre-cooling zone 18 the metal of the workpiece, near its surface, is cooled down to a pre-cooling temperature $T_V$. On reaching the welding point this metal is heated up to the welding temperature $T_S$. On leaving the welding zone the metal is quenched down to a quenching final temperature of $T_A$, the rate of quenching being represented by the slope of the quenching curve S. After leaving the post-cooling zone 19 the deposited metal gradually returns back to the holding temperature $T_H$ of the main body of the workpiece. For producing a bainite crystalline structure the quenching temperature $T_A$ should be a little below the martensite point Ms.

In a practical example the coefficient of heat transfer in the pre-cooling and post-cooling zones 18, 19 was 5000 Kcal/m$^2$ h ° C, the coefficient of thermal diffusion of the workpiece material being 0.025 m$^2$/h. The linear welding speed was 1 cm/sec. The heat flux was 20,000 Ws/cm, or 4.78 Kcal/cm. The quenching temperature $T_A$ was 200° C. The metal was cooled in the pre-cooling zone 18 for 8 – 9 seconds, the length of this cooling zone being 8 – 9 cm. In the post-cooling zone 19 the metal was cooled for about 12 seconds, this cooling zone having a length of about 12 cm.

In the process according to the invention several welding heads can if desired be used simultaneously, next to each other or the one behind the other, or in other formations. Thus the shaft can be built up by several groups of welding heads, or by multiple welding heads, section by section, to increase the speed of working and the economic efficiency of the process. Finally, the metal can if desired be added along tracks, for example by advancing the leading end of the shaft.

Figure 2:
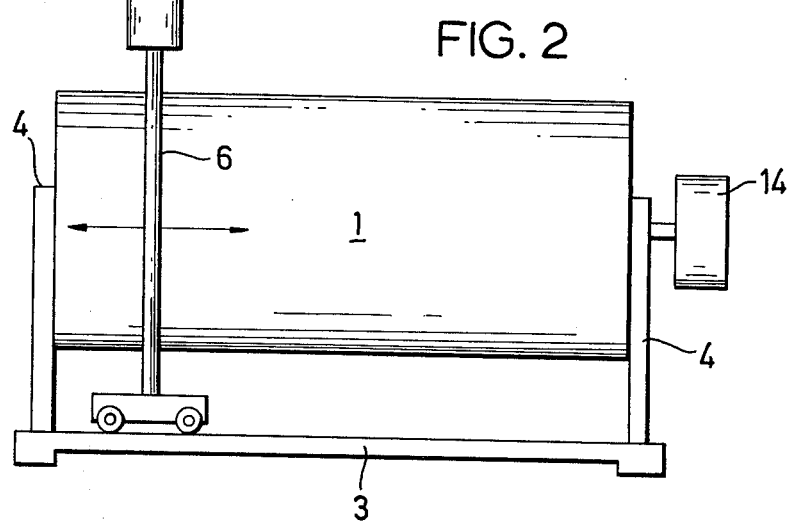
FIG. 2 is a side view corresponding to FIG. 1.

In the course of an experiment, using the apparatus illustrated in FIGS. 1 and 2, several layers of metal were applied to a supporting sheet, in the form of neighbouring longitudinal weld-beads. The number of beads per layer was decreased progressively, layer after layer, producing an approximately half-cylindrical body with a radius of 100 mm. The process was then interrupted and the supporting sheet removed, together with a neighbouring layer of deposited metal, by a cutting operation. The resulting half-cylindrical structure was then mounted in the apparatus. Several layers of metal were then deposited, by the method described above, onto the level surface produced by the cutting operation. Due to the decreasing number of weld-beads per layer there was thus formed an approximately cylindrical core with an external diameter of 160 mm. The core was then driven in rotation and further metal was added, layer after layer, by applying molten metal along a spiral track, forming a shaft. Both the core and the main body of the shaft were built up using a copper-coated deposition electrode of the following composition:

0.12% carbon
0.10% silicon
1.60% manganese 1.55% nickel
0.65% molybdenum
0.33% chromium
0.08% copper
the remainder iron.

The metal was deposited under a basic powder of the following composition:
14.0% $SiO_2$
1.0% Fe
1.3% Mn
5.4% CaO
26.0% $CaF_2$
19.0% $Al_2O_3$
2.0% $Na_2O$
31.0% MgO.

The heat flux was approximately 20,000 J/cm. The workpiece temperature in the welding region was kept approximately constant. The analysis of the deposited metal was as follows:
0.08% carbon
0.34% silicon
1.82% manganese
1.51% nickel
0.63% molybdenum
0.31% chromium
0.08% copper
the remainder iron.

By the method described above an experimental shaft was made having an external diameter of 900 mm. The surface of the shaft was finished by a machining operation, metal being cut away to a depth not exceeding 1 mm. This shows that the process according to the invention involves extremely little loss of material.

The completed shaft was then meticulously examined. It was found to contain neither pores nor segregations nor cracks. There were no non-metal occlusions. Samples taken from near the outer surface and near the core showed that chemical composition and crystalline structure were quite constant over the entire cross section. The mechanical properties of the shaft were examined at temperatures up to 500° C. Apart from fluctuations due to the experimental conditions the mechanical properties were found to be the same in the axial, tangential and radial directions.

The results of tensile tests at room temperature are shown in Table I and at 500° C in Table II. The results show that apart from experimental fluctuations the material has isotropic properties.

Table 1.

| Direction of stress | 0.2 % yield point $N/mm^2$ | Tensile strength $N/mm^2$ | Elongation % | Necking % |
|---|---|---|---|---|
| axial | 529 | 787 | 19.1 | 48 |
| tangential | 560 | 800 | 19.5 | 50 |
| radial | 563 | 740 | 16.8 | 54 |

Table II.

| Direction of stress | 0.2 % yield point $N/mm^2$ | Tensile strength $N/mm^2$ | Elongation % | Necking % |
|---|---|---|---|---|
| axial | 490 | 606 | 17.0 | 65 |
| tangential | 489 | 611 | 17.8 | 54 |
| radial | 490 | 614 | 17.2 | 64 |

In a further experiment it was intended to produce, using the process according to the invention, a shaft having a higher tensile strength. The same powder was used as before. The electrode had the following composition:
0.14 % carbon
0.15 % silicon
1.82 % manganese
1.10 % chromium
0.60 % molybdenum
2.55 % nickel
0.10 % vanadium
the remainder iron.

The experiment was done as described before. The deposited metal showed the following analysis:
0.09 % carbon
0.38 % silicon
2.05 % manganese
1.02 % chromium
0.57 % molybdenum
2.48 % nickel
0.09 % vanadium
the remainder iron.

From the resulting shaft samples were taken near the outer surface and near the core. The samples were analysed by chemical and physical methods. The material of the shaft was found to be faultless. Crystalline structure was an entirely homogeneous ferrite-perlite without any intermediate-stage structure. The yield point was 905 $N/mm^2$. Tensile strength was 1027 $N/mm^2$. The RT notch-impact strength was 65 $J/cm^2$.

These experiments showed that it is possible by the process according to the invention to make shafts of any dimensions and any desired mass with extremely little loss of material, the shafts having isotropic properties. An important advantage obtained is that by the process according to the invention shafts can be made of steels containing extremely little carbon, the material consequently showing a high magnetic induction. The properties of the shafts can be adjusted to suit the requirements without any allowances having to be made for the hot deformations and tempering which are necessary when shafts are made by conventional methods. The process according to the invention is therefore particularly suitable for use in the manufacture of rotors and shafts of unalloyed steels containing at most 0.10 % carbon; 0.05 – 1.0 % silicon; 0.20 – 2.50 % manganese; the remainder iron and impurities introduced during the melting.

The process according to the invention can of course, within the frame of the invention, be operated using low-alloy steels, particularly steels alloyed with up to 5.0 % chromium and/or nickel; up to 2.0 % molybdenum; up to 1.0 % vanadium, together with nitride-formers such as up to 0.2 % tantalum or niobium; up to 0.5 % titanium and up to 0.5 % aluminium; up to 1.5 % copper; up to 0.5 % selenium and up to 0.5 % zirconium. The percentages of alloy constituents must of course be chosen to give the finished product the necessary tensile strength and toughness, and the alloy constituents must be in balance with each other. Using unalloyed steels products can be made showing yield points of 350 $N/mm^2$ or more, the notch-impact strength being 200 $J/mm^2$ or more. Products made of alloy steels by the process according to the invention can show yield points up to 1000 $N/mm^2$ or even more. The process requires so little in the way of apparatus that it is possible to operate it right on the site, that is to say at the customer's plant.

We claim:

1. A method for manufacturing relatively large integrated structural parts of metal, particularly unitary shafts for turbines and electrical generators, said method comprising the steps of providing an initial support member, depositing on said support member an initial layer of weld metal by a welding operation consisting essentially of formation of weld beads in the absence of cooling in the area of said weld beads along contiguous tracks to form said initial layer as a continuous layer of deposited weld metal formed by said weld beads, and depositing a plurality of further continuous superposed layers of weld metal in separate succeeding welding operations each consisting essentially of formation of weld beads in the absence of cooling in the area of said weld beads, said depositing being conducted to form each of said initial and further superposed layers as separate discrete layers of weld metal individually separately formed in succeeding welding operations to manufacture said large integrated structural part essentially exclusively of said support member and said discrete separately formed superposed layers of weld material.

2. A method according to claim 1 wherein said weld beads are formed to overlap a previously formed weld bead immediately adjacent thereto.

3. A method according to claim 1 wherein prior to depositing said initial layer of weld metal upon said support member there is formed upon said support member a core for said unitary structural part by depositing in succession upon said support member by said welding operations a plurality of contiguous weld beads extending in directions longitudinally of said support member, with deposition of said longitudinal weld beads forming said core being continued to provide said core with a plurality of continuous superposed layers consisting essentially exclusively of said weld beads, subsequently removing said initial support member from said core thus formed and subsequently depositing said initial layer and said further continuous superposed layers upon said core thus formed in order to form said integrated structural part substantially exclusively from said core, said initial layer and said further continuous superposed layers.

4. A method according to claim 1 wherein an alloy is utilized in said welding operations as the weld metal deposited to construct said initial layer and said further continuous superposed layers said method including the further steps of varying the composition of said alloy of said deposited metal during said welding operation, said integrated structural part being formed with a longitudinal and a radial dimension, said alloy composition being varied in a manner to provide variation of the alloy composition of said finished integrated structural part along at least one of said longitudinal and radial dimensions.

5. A method according to claim 4 wherein said alloy composition is continuously varied during said welding operations.

6. A method according to claim 1 including the further step of adjusting the energy flux applied during said welding operation depositing said weld beads forming each of said initial layer and said further continuous superposed layers in order to control the crystalline structures of said layers.

7. A method according to claim 1 wherein a plurality of said weld beads are deposited simultaneously at spaced apart locations during the formation of each of said initial and further continuous superposed layers.

8. A method according to claim 1 including a further step of applying powder to said initial support member and to said initial layer and said further continuous superposed layers during said welding operations in order to deposit said weld beads under a cover of said powder.

9. A method according to claim 8 wherein said powder contains metal constituents.

10. A method according to claim 1 including the further steps of precooling the surface of said part locally upstream of the area of said weld beads and postcooling said deposited weld metal locally downstream of the area of said weld beads.

11. A method according to claim 10 wherein said cooling is effected by means of a fluid medium.

* * * * *